United States Patent
Stippler (10) Patent No.: US 6,218,932 B1
(45) Date of Patent: Apr. 17, 2001

(54) ANTITHEFT DEVICE FOR A MOTOR VEHICLE AND METHOD FOR OPERATING THE ANTITHEFT DEVICE

(75) Inventor: Michael Stippler, Schwandorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/375,070

(22) Filed: Aug. 16, 1999

(30) Foreign Application Priority Data

Aug. 14, 1998 (DE) ............................................... 198 36 957

(51) Int. Cl.$^7$ ............................. B60R 25/00; G08C 19/00
(52) U.S. Cl. ................... 340/426; 340/425.5; 340/539; 340/10.1; 340/10.34; 340/10.4; 340/825.69; 340/825.72; 307/10.2; 307/10.5
(58) Field of Search ................................. 340/426, 425.5, 340/539, 10.1, 10.34, 10.4, 10.41, 10.42, 825.69, 825.72; 341/176; 307/10.2, 10.5

(56) References Cited

U.S. PATENT DOCUMENTS

| 5,309,144 | * | 5/1994 | Lacombe et al. ................... 340/539 |
| 5,701,121 | * | 12/1997 | Murdoch ........................ 340/825.54 |
| 5,790,014 | * | 8/1998 | Campbell et al. .................... 340/426 |
| 5,796,180 | * | 8/1998 | Glehr .................................. 307/10.5 |
| 5,897,598 | * | 4/1999 | Puetz .................................. 340/10.2 |
| 5,937,065 | * | 8/1999 | Simon et al. ............................ 380/9 |

FOREIGN PATENT DOCUMENTS

4329697C2   10/1995   (DE) .

* cited by examiner

Primary Examiner—Donnie L. Crosland
(74) Attorney, Agent, or Firm—Herbert L. Lerner; Laurence A. Greenberg; Werner H. Stemer

(57) ABSTRACT

A first challenge signal whose reception power is measured in a portable code transmitter is transmitted by a vehicle-mounted transmission unit. Subsequently, a second challenge signal is transmitted under changed transmission conditions, and the reception power of the second challenge signal is also measured. Doors are unlocked, or the internal combustion engine is started only if the received power levels are also different. Otherwise, one or more challenge signals are transmitted once more under changed transmission conditions.

8 Claims, 7 Drawing Sheets

FIG 7

ANTITHEFT DEVICE FOR A MOTOR VEHICLE AND METHOD FOR OPERATING THE ANTITHEFT DEVICE

BACKGROUND OF THE INVENTION

FIELD OF THE INVENTION

The invention belongs to the automotive field. Specifically, the invention relates to an antitheft device for a motor vehicle with which doors are locked or unlocked or an electronic immobilizer is selectively released.

A prior art antitheft device—described in German patent No. DE 43 29 697 C2—has a vehicle-mounted transceiver unit which can transmit and receive signals. If a user wishes to enter the vehicle, a challenge/response dialog is triggered by activating a trigger switch. A challenge signal (also referred to as a request signal, question signal, or interrogation signal) is thereby transmitted from the transceiver unit to a code transmitter which is carried by the user. The latter automatically transmits back an encrypted response signal if it has previously received the challenge signal. In the motor vehicle, the response signal is compared with an expected reference signal and, if the two correspond (=successful authentication), the doors are locked or unlocked. In such an antitheft device, however, the response signal may be recorded illegitimately by a third party with a recording device. If the third party then activates the trigger switch and subsequently transmits the previously recorded response signal, the doors are unlocked even though the unauthorized person is in the possession of the code transmitter. The unauthorized person can thus relatively easily enter the vehicle and also use it.

SUMMARY OF THE INVENTION

It is accordingly an object of the invention to provide a antitheft device for a motor vehicle and a method for operating the antitheft device, which overcome the above-mentioned disadvantages of the heretofore-known devices and methods of this general type and which provides for an improved level of protection against simulated response signals.

With the foregoing and other objects in view there is provided, in accordance with the invention, a motor vehicle antitheft device, comprising:
  a motor vehicle mounted transceiver unit for transmitting a challenge signal and for receiving a response signal;
  a motor vehicle mounted security device connected to the transceiver unit;
  an evaluation unit in the transceiver unit for evaluating the response signal and for comparing an item of code information contained in the response signal with an item of expected reference code information and for controlling the security device in dependence on a result of the comparison;
  a portable code transmitter for receiving the challenge signal and for transmitting a coded response signal in response to the challenge signal; and
  a measuring device in the code transmitter for detecting a received power of the challenge signal and for adding a value representing the received power to the response signal.

In other words, the transceiver unit transmits a first request signal whose received power is measured in the code transmitter. The measured value is transmitted back to the transceiver unit in the response signal. Likewise, the reception power of a second request signal is measured and transmitted back to the transceiver unit in the response signal. The two reception powers are compared with one another in the transceiver unit and, in dependence on the comparison, a security device is controlled.

In accordance with an added feature of the invention, the security device includes a device for protecting against unauthorized use of the motor vehicle, such as an immobilizer. Furthermore, the security device may include a motor vehicle access control device for locking and unlocking access to the vehicle.

In accordance with an additional feature of the invention, the code transmitter includes a coil forming a reception antenna, and a voltage induced in the coil when the challenge signal is received is a measure of the reception power.

With the above and other objects in view there is provided, in accordance with the invention, a method of operating a motor vehicle antitheft device, which comprises:
  transmitting a first challenge signal with a motor vehicle mounted transceiver unit;
  receiving the first challenge signal with a portable code transmitter, measuring a reception power of the challenge signal in the code transmitter, and transmitting a response signal to the transceiver unit with a value representing the first challenge signal reception power;
  transmitting a second challenge signal with the transceiver unit under changed conditions as compared to the first transmitting step;
  receiving the second challenge signal with the code transmitter, measuring a reception power of the second challenge signal in the code transmitter, and transmitting a response signal to the transceiver unit with a value representing the second challenge signal reception power; and
  comparing the challenge signal power level with the second challenge signal power level in the transceiver unit and controlling a vehicle mounted security device in dependence on the comparison and if an item of code information contained in the response signal corresponds to an expected item of reference code information.

In accordance with another feature of the invention, the first challenge signal and the second challenge signal are transmitted at mutually different power levels.

In accordance with a further feature of the invention, the first challenge signal and the second challenge signal are transmitted with the same power via different antennas which are connected to the transceiver unit.

In accordance with a concomitant feature of the invention, the first challenge signal and the second challenge signal are transmitted at mutually different phase angles.

Other features which are considered as characteristic for the invention are set forth in the appended claims.

Although the invention is illustrated and described herein as embodied in an antitheft device for a motor vehicle and method for operating the antitheft device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
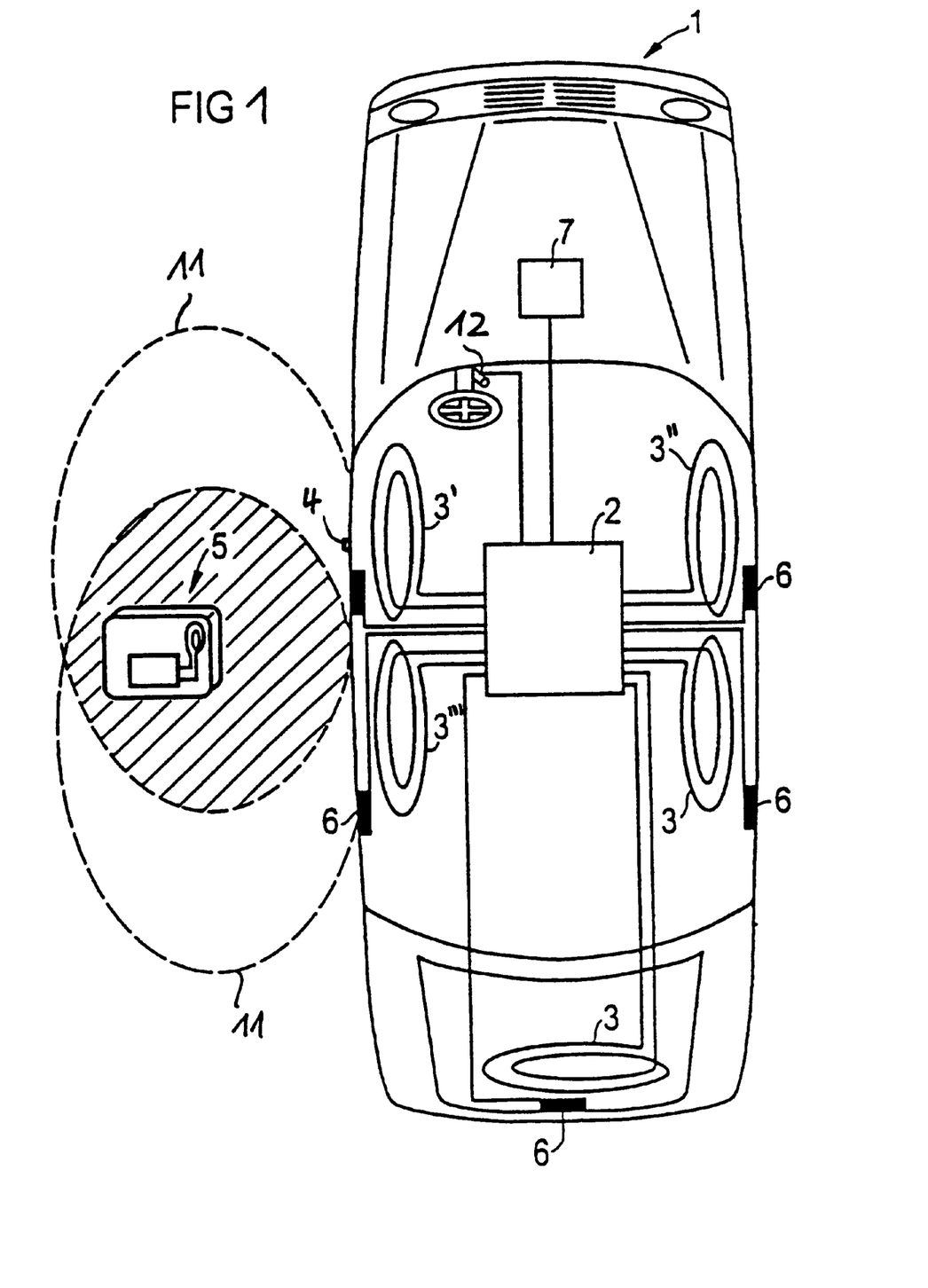
FIG. 1 is a schematic to plan view of a vehicle with a block diagram of an antitheft device according to the invention.

Referring now to the figures of the drawing in detail and first, particularly, to FIG. 1 thereof, the antitheft device for a motor vehicle 1 includes a transceiver unit 2 in the motor vehicle 1. The transceiver unit 2 transmits signals wirelessly via antennas 3 (3', 3", 3'"), receives signals, evaluates them and controls respective security devices 6, 7 in the motor vehicle 1.

The transceiver unit 2 is connected to an antenna 3' in the front, driver's side door; to an antenna 3" in the front, front-seat passenger side door, to an antenna 3'" in the rear, driver's side side door, to an antenna 3 in the other side door, to antennas 3 at the rear or in the tailgate, in the region of the fuel tank flap, in the region of the fenders or at other points distributed over the body of the motor vehicle 1. In each case a challenge signal is transmitted via the antennas 3 when a trigger switch 4, 12 is activated. If the challenge signal is received by a portable code transmitter or response transmitter (referred to below as transponder 5), the latter transmits back a response signal.

The challenge signal can also be referred to as a request signal or simply as a challenge. The response signal can also be referred to as response. A response is automatically sent back as a result of the reception of the challenge. This is referred to as a challenge/response dialog.

The response signal is received by one of the antennas 3 or some other antenna in the motor vehicle. Since each antenna is connected to the transceiver unit 2, the response signal is passed on to the transceiver unit 2 and evaluated there.

As noted above, the transceiver unit 2 is connected to security devices such as door locks 6 or operation-related control units (containing an electronic immobilizer) such as an engine controller 7, in the motor vehicle 1 connected via control lines and data lines. If the transponder 5 proves, by virtue of its response signal, to be authorized (successful authentication), one or more door locks 6 are locked or unlocked or an immobilizer is released depending on the control information contained in the response signal. In addition, further electronic devices such as interior lighting, electric window lifters, electric sunroof, heater, etc. can also be controlled with the response signal.

In order to initiate the challenge/response dialog between the motor vehicle 1 and the transponder 5, the challenge signal must initially be triggered. For this purpose, either the transponder 5 can have a non-illustrated trigger switch, whereby a start signal is transmitted to the motor vehicle 1 when the switch is activated and the transceiver unit 2 transmits the challenge signal in response to this. The trigger switch 4 can also be provided on the outside of the motor vehicle 1 in the vicinity of a door lock, whereby the challenge signal is transmitted when the handle is actuated manually. Likewise, it is possible to provide a proximity switch which triggers the transmission of the challenge signal when a person approaches.

The method of triggering the challenge signal is not essential to the invention. On the other hand, it is essential that a response signal be transmitted back automatically by the transponder 5 as a result of the reception of the challenge signal.

Figure 2:
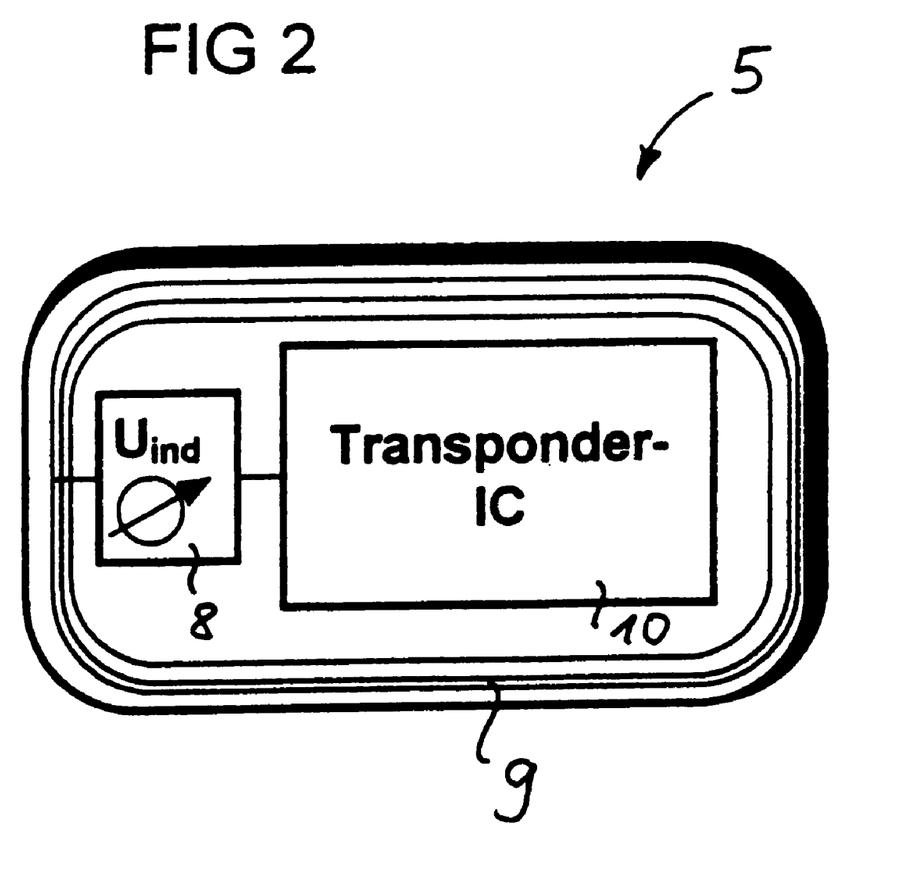
FIG. 2 is a diagrammatic block circuit diagram of a portable code transmitter of the antitheft device of FIG. 1.

Referring now to FIG. 2, the transponder 5 has a measuring device 8 with which the power with which the challenge signal is received (this is referred to as reception power) is measured. The reception power is equivalent to the field strength prevailing at the location of the transponder 5, of the (electro)magnetic field generated by one of the antennas 3.

In the present exemplary embodiment, the antennas 3 in the motor vehicle 1 are designed as loop antennas and they generate an alternating magnetic field by which the challenge signal is inductively transmitted. If there is a receiver coil in this magnetic field, a voltage is induced in it, causing the challenge signal to be received. The level of the induced voltage depends essentially on the field strength and on the orientation or position of the coil with reference to the loop antenna.

The transponder 5 has a reception coil 9 in which a voltage is induced if the transponder 5 is located within the magnetic field. The further the transponder 5 is moved away from the transmitting antenna 3, the smaller the induced voltage becomes. The induction voltage can be measured by the measuring device 8, such as for example a voltmeter. The measured voltage is thus a measure of the reception power.

The induced voltage can be measured digitally (using an A/D converter) or in an analog way. According to the invention, the value detected is added to the response signal. The response signal is generated in a transponder IC 10 from secret user-specific or vehicle-specific data by coding or encrypting. The reception power is integrated into the response signal in such a way that it cannot easily be recognized or removed by unauthorized persons. The response signal is then modulated and transmitted to the transceiver unit 2 in the vehicle. There, the response signal is decoded/decrypted and the code information contained in it is evaluated. In this way, the reception power, i.e. the value of the induced voltage, is obtained from the response signal. The reception power is buffered in the transceiver unit 2. So that the antitheft device is secure enough, the challenge signal according to the invention is transmitted repeatedly, specifically with modified power or via different antennas 3. The challenge/response dialog process takes place within a few milliseconds. However, the challenge signals are transmitted in chronological succession with brief intermediate intervals. Since the position/orientation and the location of the transponder 5 does not change in this short time, or changes only insignificantly, the measured reception power is a significant physical variable which characterizes the distance between the transponder 5 and the antennas 3. For this reason, the challenge signal must be received with different reception powers if the transmission conditions are changed in terms of power and distance between the transponder and antenna.

The reception power levels are transmitted back to the transceiver unit 2 in each case and evaluated there. If the received power levels are always identical, this is a sign that with a high degree of probability the response signal does not originate from the transponder 5 located in the vicinity but has instead been reproduced by recording without authorization and triggering manually.

Figure 3:
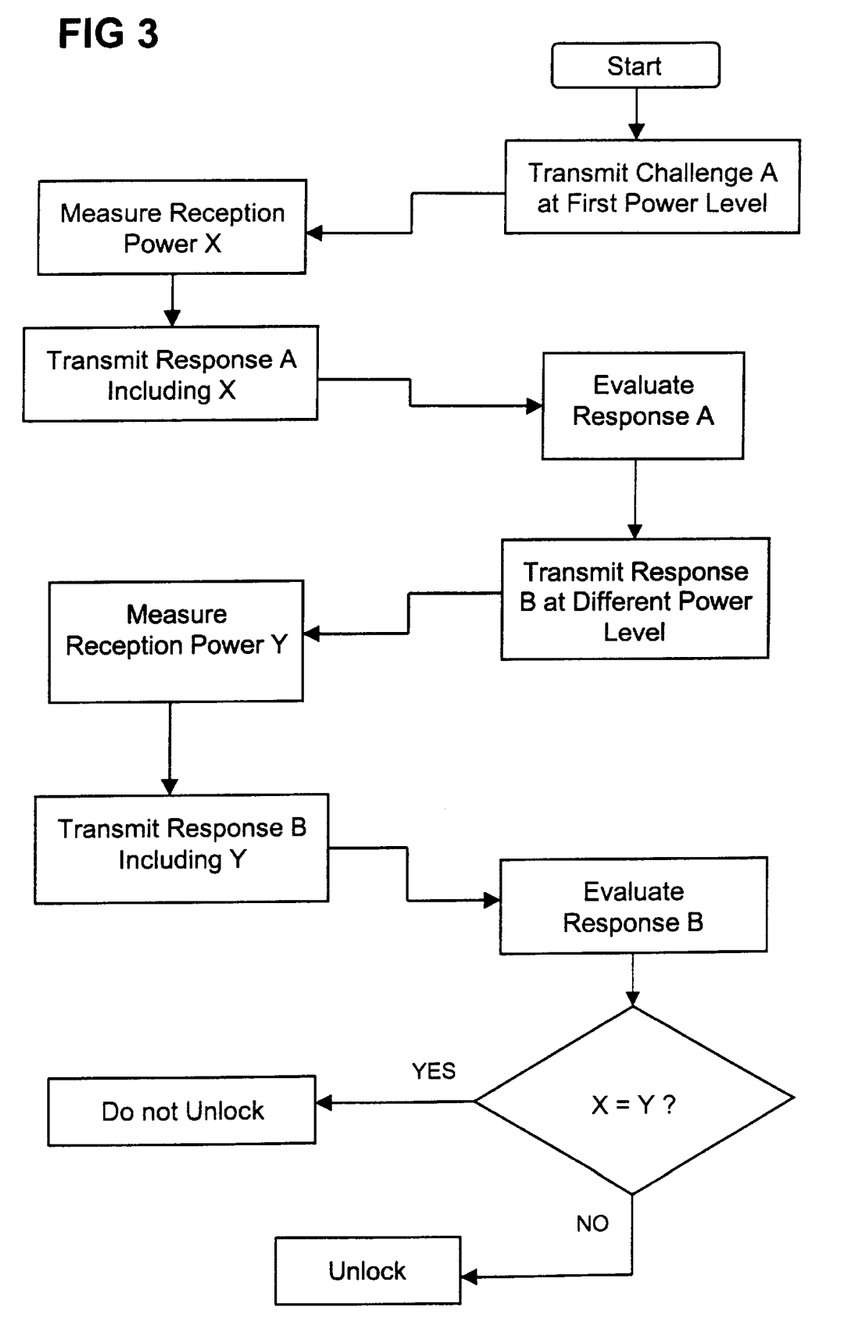
FIGS. 3 to 7 are all flowcharts illustrating various exemplary embodiments of methods for operating the antitheft device according to FIG. 1.
Figure 4:
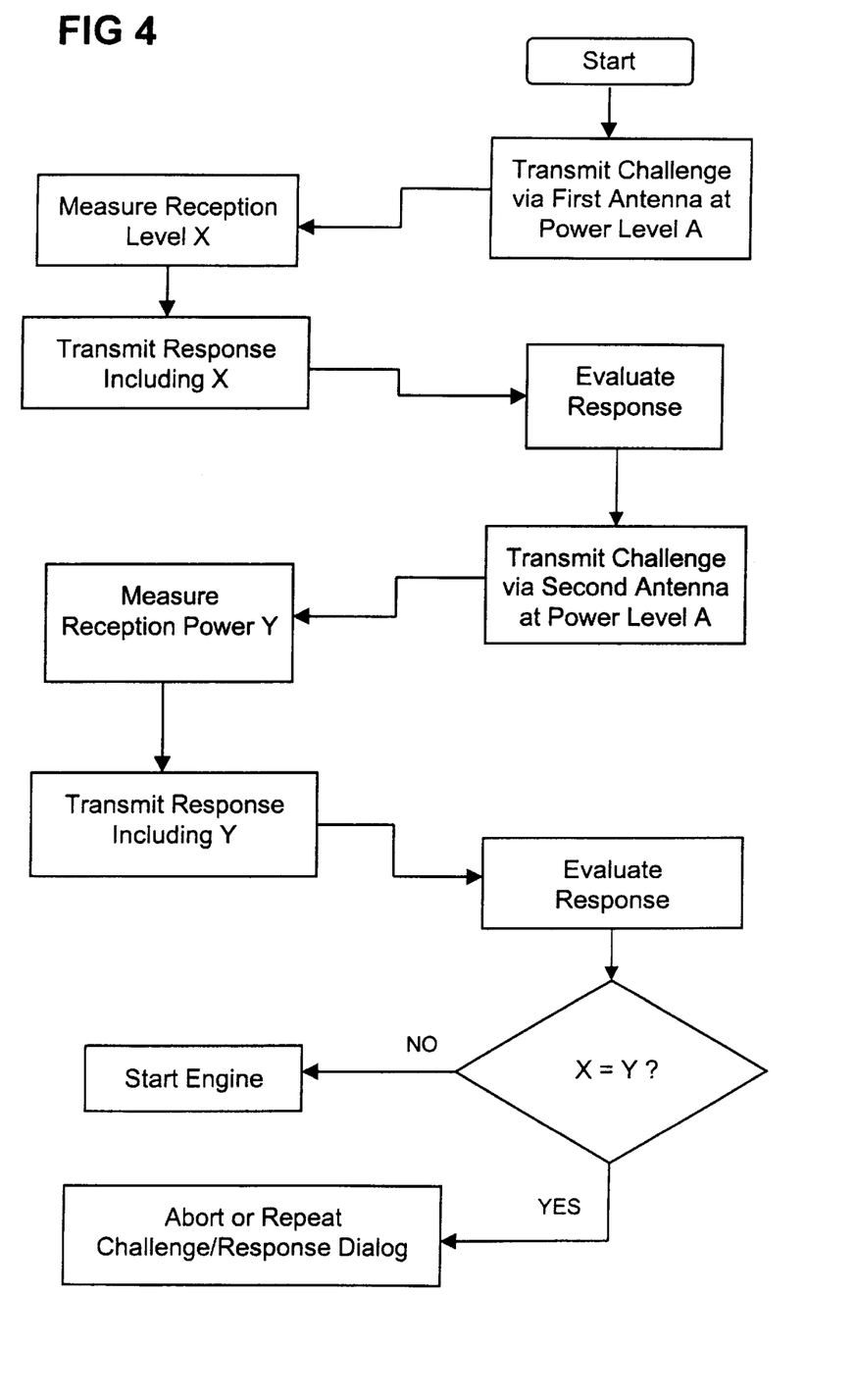
Figure 5:
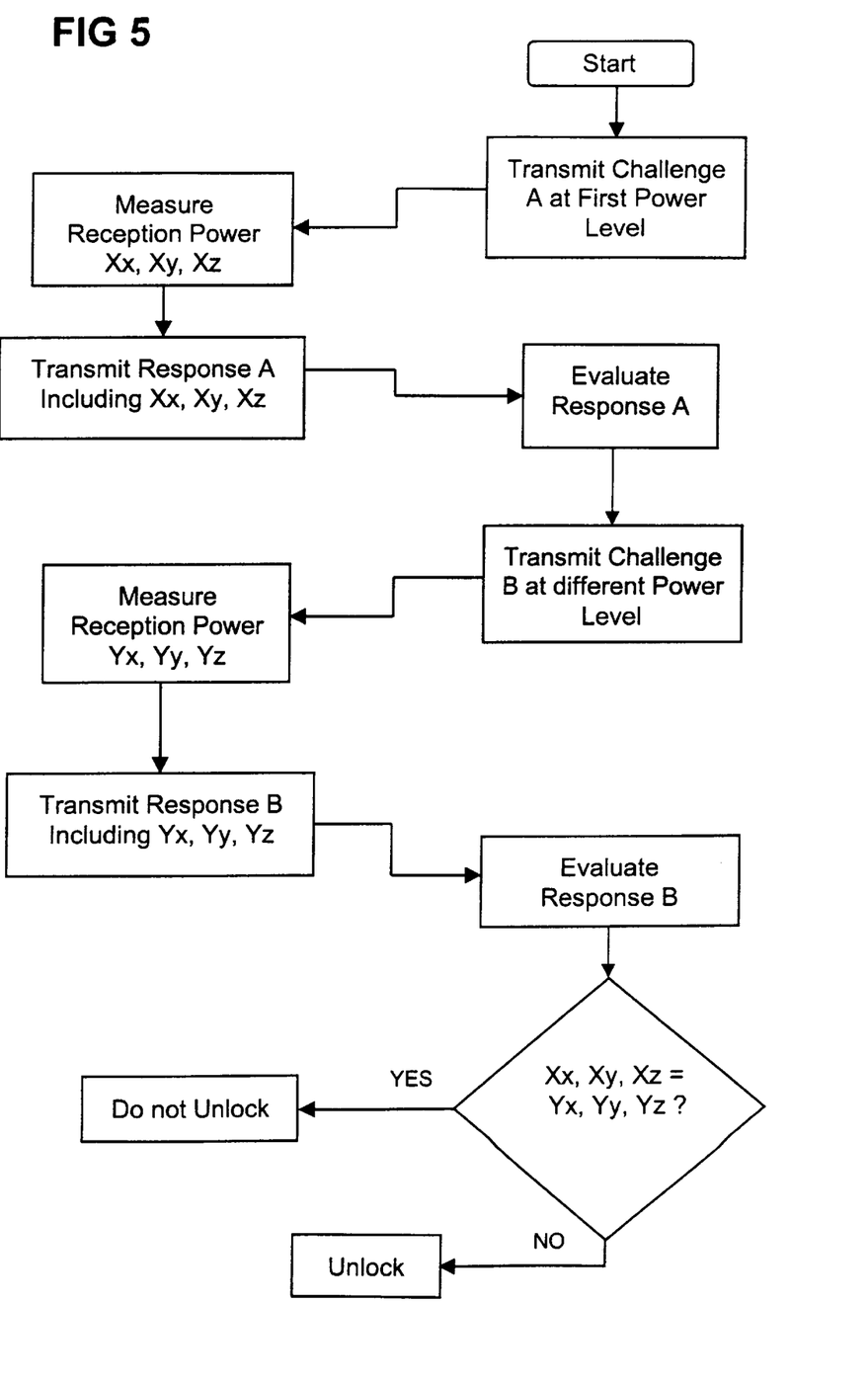
Figure 6:
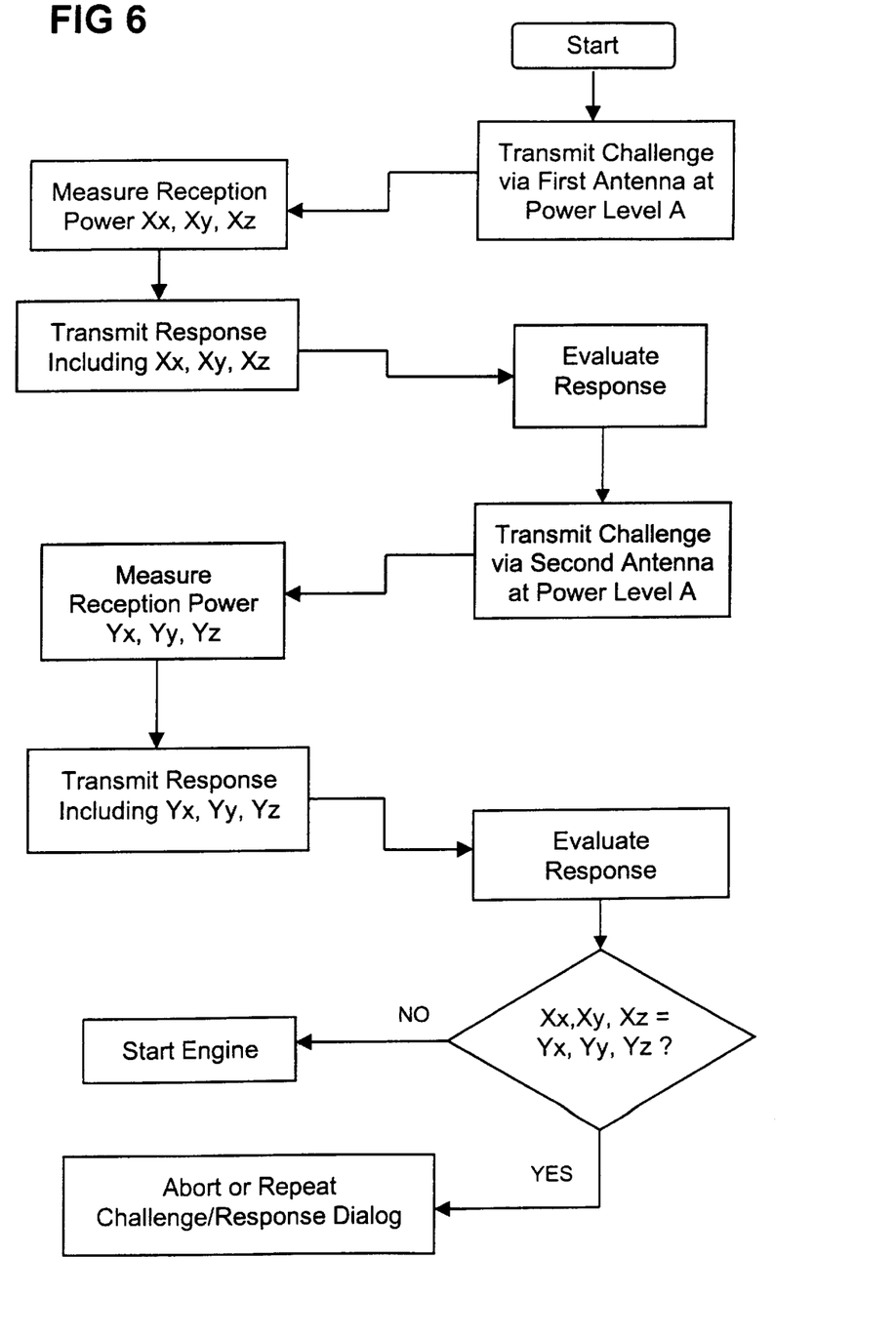
Figure 7:
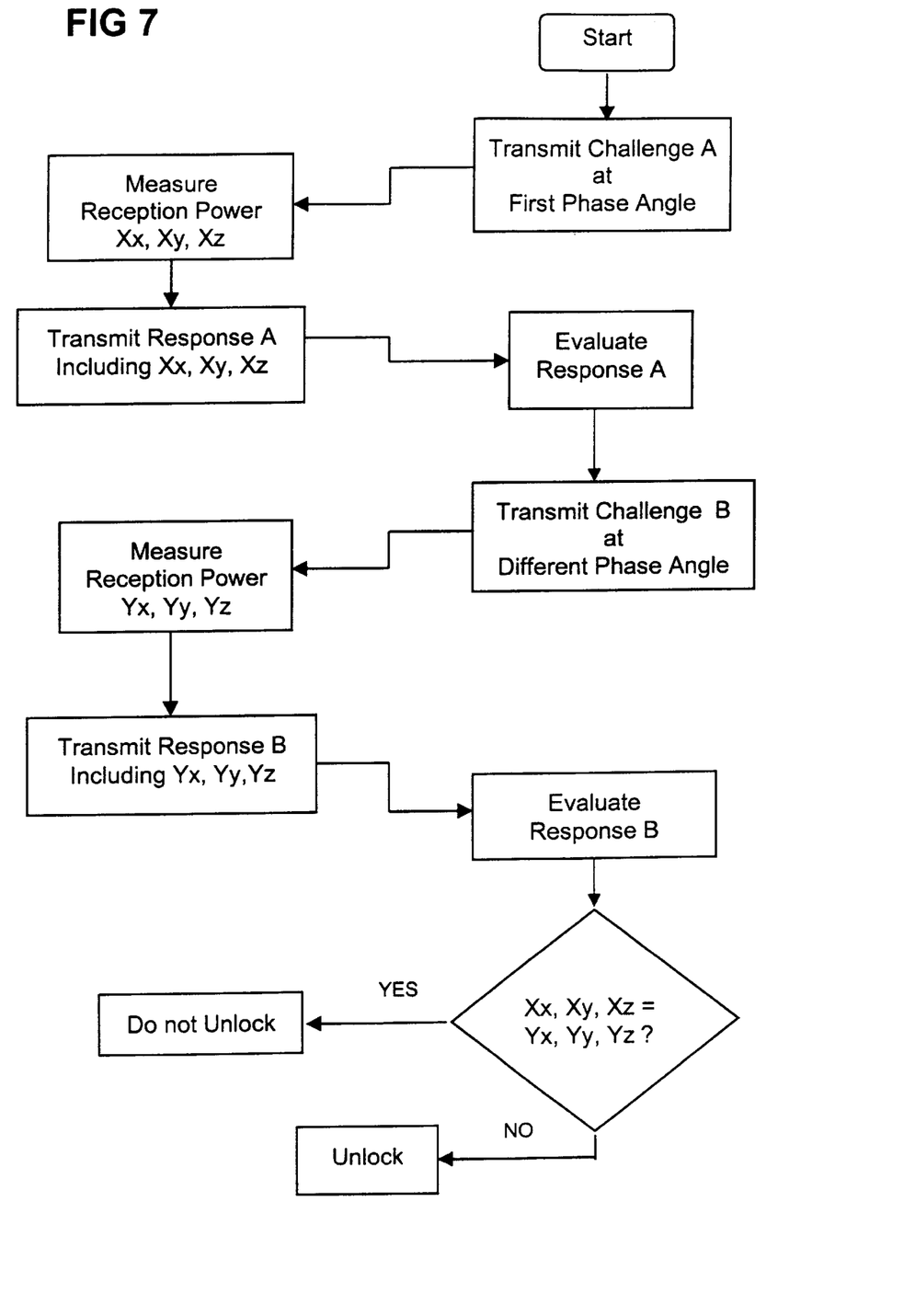

FIGS. 3, 5, and 7 illustrate various methods for unlocking doors (access control) and FIGS. 4 and 6 illustrated methods for starting the engine (immobilizer). Here, FIGS. 3 to 7 show the method steps which are carried out in the motor vehicle, illustrated on the right-hand side, and the method steps which are carried out in the transponder 5 are illustrated on the left-hand side.

If the trigger switch 4 is activated, according to FIG. 3 a first challenge A is initially transmitted for the first transmission power level. The transponder 5 receives the challenge A with an assumed reception power X. The reception power X depends on the distance between the transponder 5 and the transmitting antenna 3. The transponder 5 adds the value of the reception power X to its response A and transmits the response A back to the transceiver unit 2. There, the response A is evaluated and the reception power X is obtained from the response.

In a subsequent step, a second challenge B is transmitted with a transmission power which is significantly different from the first transmission power, via the same antenna 3 as before. The reception power Y is then measured in the transponder 5. The transponder 5 adds the reception power Y to the second response B and transmits this back to the transceiver unit 2. There, the response B is re-evaluated and the reception power Y is obtained from it.

Subsequently, the two reception powers X and Y are compared with one another. Since it can usually be assumed that in this case the reception power levels X and Y are different since the transmission power levels were different and the location of the transponder 5 has not changed significantly, unlocking is authorized and performed only if the reception power levels X and Y are in fact significantly different. However, unlocking is at first not authorized if the reception levels are approximately the same.

However, unlocking is performed only if the code information contained in one response or in each response A or B corresponds to an item of expanded code information which is stored in the transceiver unit 2. This code information is the only means by which the user proves his or her authorization (authentication) with the transponder 5. The comparison of the reception power levels X and Y merely constitutes an additional way of checking the authorization.

Instead of having a different power level, the challenge B can also be transmitted via a different antenna 3. If, as illustrated in FIG. 1, there is both an antenna 3 in the driver's door and an antenna 3 in the driver's side rear door, each antenna 3 produces in each case magnetic fields whose range 11 is illustrated by way of example by broken lines. The broken lines constitute here a location with an identical reception power. The nearer the transponder 5 comes to the antenna 3, the greater the reception power becomes.

Within the hatched region in FIG. 1, the fields of the two antennas 3' and 3''' overlap. Therefore, in the center of this hatched region it is possible for the transponder 5 to receive the same reception power from each antenna 3' and 3'''. However, outside this central line a different power level is respectively received by the front antenna 3' and by the rear antenna 3'''. If these reception power levels are also reported back to the transceiver unit 2 as being significantly different, it is possible for the doors to be unlocked. To enable the reception power of one antenna 3', 3''' to be detected clearly, the challenge signals are transmitted at different times one after the other. In this way, errors as a result of a possible superimposition of fields is avoided.

In the particular case in which the transponder 5 happens to be arranged precisely in the center between the two antennas 3', 3''', a further challenge/response dialog can be carried out in which the transmission power of one of the two antennas 3', 3''' is then significantly changed. Consequently, the reception power Z which is then received must differ significantly from the reception power levels X and Y so that unlocking can then take place.

In the same way, the method can be used to start the engine in accordance with FIG. 4. As soon as a trigger switch 12, such as an ignition starter switch 12 or a starter switch, is activated, a first challenge is transmitted via a first antenna 3 with a predefined transmission power A. The transponder 5, which is now located in the interior of the vehicle, measures a reception power X. The transponder 5 adds the reception power X to its response and transmits it back to the transceiver unit 2, which evaluates the response.

Subsequently, a second challenge is transmitted with the same power level A via a second antenna 3. The transponder 5 receives a reception power Y. The transponder 5 again adds the reception power Y to the response and transmits it back to the transceiver unit 2, where the response is evaluated.

Since the driver usually carries the transponder 5 on his or her person and has sat down on the driver's seat when the vehicle is started, the transponder 5 is arranged asymmetrically in the motor vehicle 1 (specifically in the region of the driver's seat). If the first challenge is transmitted via the front, driver's side antenna 3' and the second challenge transmitted via the front, front-seat passenger side antenna 3'', the received reception power levels X and Y ought to be different. As a result, the immobilizer can be released and the internal combustion engine can be started. If the reception power levels X and Y are identical, the method can be aborted since it is possible to suspect that the responses have each been previously recorded by an unauthorized user and have been reproduced after the trigger switch was activated.

However, for the sake of certainty it is possible to carry out a further challenge/response dialog since the transponder 5 could happen to be in the center of the vehicle on the central console. In this case, the transponder 5 is equally distant from the two antennas 3' and 3''.

In the further challenge/response dialog the transmission power level of one antenna 3 can be changed significantly with respect to the previous challenge/response dialog. As a result, a reception power Z which also differs clearly from the reception power levels X and Y would then have to be received. If this is the case, the immobilizer can be released.

The evaluation unit of the transceiver unit 2 could also test the reception power levels X, Y and Z to determine whether they are equal or to determine which is greater and which is smaller than the other. If the response were to come from an unauthorized user as a result of reproduction of a response signal which has been recorded without authorization, the reception power is usually always identical. If response signals with different transmission conditions happen to have been recorded, the recording unit will however not be provided with the accompanying current transmission conditions and therefore will not know whether the transmission power level X is greater than or smaller than Y. This is an additional protection against misuse.

Instead of changing the transmission power level, a further challenge can be transmitted via a further antenna 3. Thus, in the case of the first challenge/response dialog, the first challenge can be transmitted via the driver side front antenna 3 and the second challenge can be transmitted via the front-seat passenger side front antenna 3. If the reception power levels are approximately the same, the third challenge can be transmitted via the driver side rear antenna 3. If the transponder 5 is located on the central console between the driver and the front passenger seat, the third reception power Z, which is significantly lower than the reception power levels X and Y, is then measured. This is because the transponder 5 is positioned farther from the rear, driver side antenna 3 than from the front, driver side antenna 3. If the reception power levels X, Y and Z do not differ, the engine is not started. If appropriate, an alarm can be triggered, indicating an unauthorized attempt at access or starting.

The transponder 5 can have, in addition to its coil 9, two further antennas which are each arranged approximately at a right angle with respect to one another (so-called 3-D card, if the transponder 5 is arranged on a chip card or smart card). The antennas used can be so-called ferrite coils and/or air-core inductors. Each coil is assigned its own input stage in which in each case a measuring device for measuring the induced voltage is arranged. In this way, the transponder 5 can measure the reception power in its three spatial coordinates $X_x$, $X_y$ and $X_z$ or $Y_x$, $Y_y$ and $Y_z$ of the magnetic field at the location of the transponder 5. With such a transponder 5 it is possible to carry out methods for unlocking doors (according to FIGS. 5 and 7) or methods for starting an engine (in accordance with FIG. 6) in which in each case the spatial coordinates of the reception power (i.e. $X_x$, $X_y$ and $X_z$ or $Y_x$, $Y_y$ and $Y_z$) are measured and compared with the previous ones. Here, in each case the individual components are compared with one another or the relative magnitudes of all three components are compared with one another. The individual components $X_x$, $X_y$ and $X_z$ or $Y_x$, $Y_y$ and $Y_z$ or the relative magnitudes would then have to be changed in accordance with the changed transmission power or a phase angle which has been changed at the transmission end. If no change is measured, it may be a case of unauthorized access to the motor vehicle.

Instead of changing the power (as in FIGS. 3 and 5) or changing to another transmission antenna (as in FIGS. 4 and 6), it is possible, as illustrated in FIG. 7, to utilize the change in the phase angle of the transmitted challenge signals to unlock doors. The phase angle can also be changed for the procedure for starting the engine. As a result of the phase angle of the transmitted challenge signals being changed, different reception power levels result at the location of the transponder 5 as a result of the phase shift and these are used for the method since the reception power changes spatially with the phase angle.

The change in the phase angle should however not be 180° or an integral multiple thereof since otherwise the reception power cannot be distinguished from the previous one in terms of absolute value. Thus, the phase angle in the case of the second challenge signal may differ, for example, by 45° or 90° from the previously transmitted first challenge signal which, for its part, was transmitted with a phase angle of 0°.

The challenge signals are usually transmitted via loop antennas in the doors at a frequency of approximately 125 kHz. The response signal can usually be transmitted back at a frequency of 433 MHz. The door locks 6 or an immobilizer may be used as the security devices.

The door locks 6 lock or unlock the doors so that access to the motor vehicle 1 can be prevented or made possible. The immobilizer can be an electronic circuit in the engine controller 7 which is present in any case and which permits the motor vehicle 1 to be started and used only if proof of authorization is provided. A coded enable signal, which activates the engine controller 7 and starts the engine, is generated only if the response signal is recognized as being authorized by reference to its coded code information contained in it. Instead of the engine controller 7, other control units can also serve as an immobilizer. Likewise, an on/off switch in the ignition circuit or a lock valve in the fuel circuit can serve as an immobilizer. A plurality of control units can also be integrated into the immobilizer. However, each security device protecting against unauthorized use of the motor vehicle 1 (immobilizer) is only enabled by means of a coded enable signal if the response signal has proven authorized.

The reception power of a challenge signal does not have to be measured in terms of its absolute magnitude. It is sufficient if the reception power is determined by means of comparison relative to the previously measured or subsequently measured reception power. Here, it is sufficient to determine whether the reception power is identical to, or greater than or smaller than a previously measured reception power.

The transponder 5 can be arranged on a chip card, as illustrated in FIG. 2. Likewise, it may be arranged on a handle of a conventional key. However, the design of the transponder 5 is irrelevant to the present invention. Instead of inductive transmission during the challenge/response dialog, other methods of transmission, such as radio, may also be used as long as the reception power is dependent on the distance between the transponder and the antenna.

The measuring device 8 can also be an ammeter, a power meter or some other measuring device which can be used to measure the reception power at the location of the transponder 5.

I claim:

1. A motor vehicle antitheft device, comprising:
   a motor vehicle mounted transceiver unit for transmitting a challenge signal and for receiving a response signal;
   a motor vehicle mounted security device connected to said transceiver unit;
   an evaluation unit in said transceiver unit for evaluating the response signal and for comparing an item of code information contained in the response signal with an item of expected reference code information and for controlling said security device in dependence on a result of the comparison;
   a portable code transmitter for receiving the challenge signal and for transmitting a coded response signal in response to the challenge signal; and
   a measuring device in said code transmitter for detecting a received power of the challenge signal and for adding a value representing the received power to the response signal.

2. The antitheft device according to claim 1, wherein said security device includes a device for protecting against unauthorized use of the motor vehicle.

3. The antitheft device according to claim 1, wherein said security device is a motor vehicle access control device.

4. The antitheft device according to claim 1, wherein said code transmitter includes a coil forming a reception antenna, and a voltage induced in the coil when the challenge signal is received is a measure of the reception power.

5. A method of operating a motor vehicle antitheft device, which comprises:
   transmitting a first challenge signal with a motor vehicle mounted transceiver unit;
   receiving the first challenge signal with a portable code transmitter, measuring a reception power of the challenge signal in the code transmitter, and transmitting a response signal to the transceiver unit with a value representing the first challenge signal reception power;
   transmitting a second challenge signal with the transceiver unit under changed conditions as compared to the first transmitting step;
   receiving the second challenge signal with the code transmitter, measuring a reception power of the second challenge signal in the code transmitter, and transmitting a response signal to the transceiver unit with a value representing the second challenge signal reception power; and comparing the challenge signal power level with the second challenge signal power level in the transceiver unit and controlling a vehicle mounted security device in dependence on the comparison and if an item of code information contained in the response signal corresponds to an expected item of reference code information.

6. The method according to claim 5, wherein the first challenge signal and the second challenge signal are transmitted at mutually different power levels.

7. The method according to claim 5, wherein the first challenge signal and the second challenge signal are transmitted with the same power via different antennas connected to the transceiver unit.

8. The method according to claim 5, wherein the first challenge signal and the second challenge signal are transmitted at mutually different phase angles.

* * * * *